United States Patent Office 3,539,687
Patented Nov. 10, 1970

3,539,687
MEDICINAL COMPOSITIONS CONTAINING
5β - BISNORCHOLANE-22-AMINO DERIVA-
TIVE AS AN ACTIVE INGREDIENT
Ferdinand Kuhnen, Mahmod Muftic, Rainer Philippson, and Emanuel Kaspar, Berlin, Germany, assignors to Schering AG., Berlin, Germany
No Drawing. Filed Aug. 30, 1966, Ser. No. 576,158
Claims priority, application Germany, Sept. 3, 1965, Sch 37,674; Nov. 27, 1965, Sch 38,090
Int. Cl. C07c 173/10
U.S. Cl. 424—241                                18 Claims

ABSTRACT OF THE DISCLOSURE

This invention relates to bacteriostatic, fungistatic and trichomonochidally active bisnorcholane derivatives with the general formula

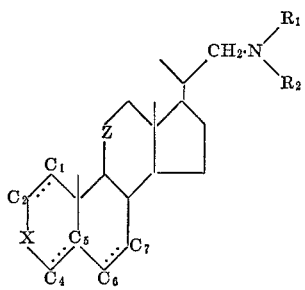

and their ammonium salts wherein $R_1$ and $R_2$ are the same or different, and signify hydrogen, a possibly substituted alkyl-, aryl-, aralkyl-, heterocyclic residue or common members of a possibly substituted ring system, which may also be interrupted by an additional hetero-atom, preferably nitrogen or oxygen, Z>$CH_2$, CH(OH) or >C=O, X>$CH_2$, >CH(OH), >CH(OAcyl), >C=O and $C_4$------$C_5$ a single or double bond with 5 beta-H configuration, and $C_1$------$C_2$ and $C_6$------$C_7$ likewise a single or double bond.

The preparation of the new compounds according to the invention is done by methods known as such, in that either
(a) The corresponding 22-aldehyde with the general formula

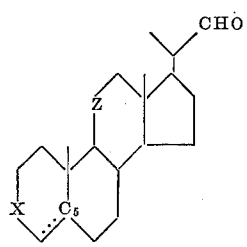

wherein X, Z and $C_4$------$C_5$ have the above stated meaning, is reacted with the desired base

and the double bond formed by this is reduced, if so desired with simultaneous hydrogenation of a delta⁴ double bond present in the starting material, or (b) The carbonyl oxygen of the amide group in compounds with the formula

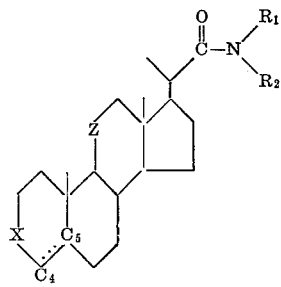

wherein $R_1$, $R_2$, Z, X and $C_4$------$C_5$ have the above mentioned meaning, is reduced to a $CH_2$ group, whereby if so desired a 3-keto group present in the starting produce is previously protected provisionally, or
(c) Compounds with the formula

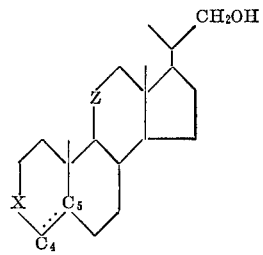

wherein Z, $C_4$------$C_5$ and X have the above mentioned meaning, are esterified in the 22-position with a sulfo-acid and the resultant 22-ester is reacted with the desired base, or
(d) The 22-sulfo-acid ester prepared according to technique in above (c) is converted in the usual manner known as such, into the 22-halogen compound, preferably the 22-iodo- or 22-bromo compound, and it reacted with the finally desired base and in the products prepared according to techniques in above (a), (b), (c) and (d), if so desired, an 11- or 3-OH group present in the starting produce or formed in the course of the reaction is subsequently acylated or oxidized or a 3-O-acyl group is saponified or an 11- and/or 3-keto group and/or delta⁴ double bond is reduced or in the presence of a delta⁴ double bond if so desired an additional delta¹ and/or delta⁶ double bond is introduced, or the 22-amino group formed is mono- or dialkylated with $R_1$ and /or $R_2$ meaning hydrogen, and the primary product thus obtained converted if so desired into the corresponding secondary, tertiary or quarternary ammonium salt.

The technique (a) of the procedure according to the invention is for example so executed that the corresponding 22-aldehydes are reacted with the customarily usable primary or secondary amines, such as possibly substituted mono- or dialkylamines, mono- or diarylamines, alkylarylamines, such as methylaniline, ethylaniline, as well as possibly with substituted piperidine, morpholine, pyrrolidine or the like. When bases are used in which neither $R_1$ nor $R_2$ designates a hydrogen atoms, then one obtains in this condensation products in which the double bond formed is in the 20(22) position. If, however, bases are used for the condensation reaction in which $R_1$ and/or $R_2$ designates hydrogen, then one obtains condensation products with a C=N double bond. The subsequent reduction of the double bond formed takes place according to working methods, known as such. The hydrogenation in the presence of the customary metal catalysts, such as for example platinum oxide, is generally suitable. But the reduction can also be carried out according to known chemical working methods, such as for example, by means of formic acid. The C=N double bond, however, is also reducible for example with hydrides, such as lithium aluminum hydride or sodium boron hydride.

The reduction of the carbonyl oxygen atom of the amide group as in technique (b) above, is carried out according to the methods and with the reducing agents that are known to the specialist for the reduction of acid amides to the corresponding amines. Preferred suitable reducing agents are in particular lithium aluminum hydride, aluminum alkyl compounds, such as diisobutyl aluminum hydride and other complex metal hydrides. In this, the starting product is reacted in a suitable inert solvent, such, as for example, tetrahydrofuran, dioxan, ether, benzene and others, with the reagent at preferably increased reaction temperature, and if so desired with the exclusion of atmospheric oxygen, nitrogen or argon are preferably suitable is protective atmosphere or blanket.

If the compounds according to the invention are to be prepared by technique (c) above, then the substitution of the previously introduced 22-sulfo-acid ester, preferably of the 22-mesyl or 22-tosyl residue, occurs through the finally desired amino group likewise according to methods, known as such in the art. The exchange expediently takes place in such a way that for example, the corresponding 22-mesyl or -tosyl ester in a suitable solvent, such as for example, benzene, is reacted with the desired base, which may also be a solvent at the same time, at preferably increased reaction temperature. It may be expedient in some cases here to convert the 22-sulfo-acid ester in a manner known as such, first into the corresponding 22-halogen, preferably iodo or bromo compound, for example, by means of alkali halides, such as sodium iodide, in an anhydrous solvent, which is then reacted with the finally desired base. The procedural modification is preferably applicable for the production of the 3-keto- or 3-keto-delta$^4$-compounds, because in the present case the protection of the 3-keto group needed for example according to the technique (a), or the later oxidation of a hydroxyl group in the 3-position can be saved.

The subsequent introduction, if it is desired, of the delta$^1$- and/or delta$^6$-double bond likewise takes place according to methods known as such preferably by means of selenious acid (delta$^1$-double bond) or by means of dichlorodicyano-benzoquinone or chloranil (delta$^6$- and if so desired followed by delta$^1$-double bond).

The salt formation takes place with all acids or organic halides, which customarily form ammonium salts with the above mentioned bases, such as mineral acids, organic acids, alkyl halides, such as for example methyl iodide.

Listed by way of example, the purposes herein are the following acids: Hydrochloric acid, sulfuric acid, phosphoric acid, formic acid, acetic acid, butyric acid, caproic acid, oxalic acid, succinic acid, benzoic acid and the like. As oxidation methods can be considered all those suitable for the conversion of a 3-OH group into the 3-keto group, such as for example the method according to Oppenauer.

It is known (H. L. Herzog, Am. Soc. 77 (1955), p. 5324), that delta$^5$-bisnorcholane and 5 alpha-bisnorcholane derivatives are effective against *Candida albicans*.

It has now been found that the 22-N-substituted bisnorcholane derivatives of the above cited formula according to the invention are not only effective against *Candida albicans*, but also against Staphylococci, *Klebsiella pneumoniae*, bacteria of the Proteus group, pathogenic yeasts as well as particuarly against Dermatophytes and Trichomonades, which is particularly advantageous in combatting mixed infections.

The excellent fungicidal action is to be shown by the example of 22-(N-piperidyl) - 5 beta - bisnorcholane - 3 alpha-olhydrochloride (I) and of 22-(N-piperidyl)-5 beta-bisnorcholane-3-one hydrobromide (II) compared to the known Griseofulvin, whereby the indicated concentrations reproduce the dosage at which total growth inhibition occurs in vitro as indicated herein following:

A—*Microsporum gypsum*, concentration gamma/ml.
B—*Trichophyton mentagrophytes* var. *persicolor*, concentration gamma/ml.

| Preparation | A | B |
| --- | --- | --- |
| Griseofulvin | 50 | 200 |
| I | 5 | 10 |
| II | 10 | 50 |

From this is can also be seen that micro-organisms which already show resistance to Griseofulvin, can still be combatted or affected by the compounds produceable according to the invention. The compounds that can be prepared according to the invention are thus also still suitable for combatting those strains which are resistant to other bacteriostatically active substances.

22 - N - amino - 5 alpha-bisnorcholane hydrochloride proves to be fully effective at 1 gamma/ml. against *Micrococcus pyogenes aureus* (strain 127c). Erthyromycin acts against this strain with 5 gamma and Streptomycin with 10 gamma/ml.

The compounds according to the invention serve for the external parenteral or oral treatment of for example, the following afflictions: Dermatomycoses, septic conditions, pneumonias, urinary passage infections, etc. They are in particular also well suited for the treatment of mixed infections.

Some of the new compounds according to the invention are also distinguished by a strong inflamation-inhibiting effect. A specific example is 22-N-piperidyl-delta$^4$ bisnorcholene-11 beta-Ol-3-one.

The compounds can be put into the prepared forms customary in pharmacology, and may be applied by injection as well as per se or for example locally as a salve. For the peroral application, the manufacture of the substances can be done with or without the additives, carrier substances, taste correcting agents and the like customary in galenical pharmacology, for example in the form of a powder, as tablets, sugar-coated pills, capsules or pills.

The preparation of the starting products, which have not been described previously, for which no protection is claimed within the frame of the present invention, is conducted according to methods known as such in the art, for example, from the corresponding 22-aldehydes. For the preparation of the starting products according to technique (b) these are oxidized to the corresponding 22-carbonic acids, which converted, likewise in a manner known as such in the art, through the corresponding 22-acid chlorides into the desired 22-amides, and for the preparation of the starting products according to technique (c) the 22-aldehydes are reduced to the corresponding 22-alcohols.

The following examples are illustrative of the invention, without restriction thereto.

EXAMPLE 1

(a) 5 gm. of 3 alpha-acetoxy - 22 - (N - piperidyl)-delta$^{20(22)}$-5-bisnorcholane, prepared analogously to Example 3(a) are dissolved in 350 ml. of glacial acetic acid and hydrogenated with 500 mg. platinum oxide as a catalyst. After this, the product is suctioned from the resultant catalyst, the filtrate is stirred into ice water and reacted to weakly alkaline reaction. The hydrogenated reaction product flocculates out during this, and is then isolated with methylene chloride. The methylene chloride phase, washed with water and dried with sodium sulfate, is evaporated to dryness under reduced pressure and one obtains 4.8 gm. of 3 alpha-acetoxy-2-(N-piperidyl) 5 beta-bisnorchlo-olane.

(b) 4.8 gm. of 3 alpha-acetoxy - 22-(N-piperidyl)-5-beta-bisnorcholane are heated with 250 ml. of 4% solution of potassium hydroxide for ¾ hour under reflux. After cooling, the reaction mixture is stirred into ice water and the saponification product is isolated by extraction with methylenechloride. The methylenechloride extracts washed with water and dried over sodium sulfate after evaporation under diminished pressure yield 4.55 gm. 22-(n-piperidyl)-5-beta-bisnorcholane-3-alpha-ol).

(c) By introducing hydrogen chloride gas into a solution of 4.55 gms. of 22-(N-piperidyl)-5 beta-bisnorcholane-3 alpha-ol in about 200 mls. of ether there separate out 4.8 gm. of 22-(N-piperidyl)-5 beta-bisnorcholane-3-alpha-ol-hydrochloride as a white, crystalline precipitate, which after being suctioned, washed with ether and dried, melts at 249/254–260 deg. C.

*Analysis.*—Calculated for $C_{27}H_{48}ClNO$ (percent): N, 3.20; Cl, 8.10. Found (percent): N, 3.44; Cl, 8.12.

EXAMPLE 2

(a) 660 mg. of 22-(N-piperidyl)-5 beta-bisnorcholane-3-alpha-ol are dissolved in 86 ml. toluene and reacted with 2.06 ml. of cyclohexanone. After this, one distills until a clear distillate is obtained. A solution of 163 mg. aluminum is o-opropylate in 5 ml. toluene is added to the boiling solution and one heats for 40 minutes under reflux. After cooling to 50° C., 945 mg. of Rochelle salt in 1 ml. water are added and the mixture is stirred for 1 hour. Then it is distilled with steam until no more oil comes over. After the reaction mixture has cooled to 50° C., it is stirred for ½ hour after addition of 0.6 ml. of glacial acetic acid. The oxidation product is isolated by extraction with toluene. The toluene phase is washed neutral with water, dried with sodium sulfate and concentrated under reduced pressure. One obtains 370 mg. 22-(N-piperidyl)-5 beta-bisnorcholane-3-one.

(b) By introducing hydrogen chloride into a solution of 370 mg. of 22-(N-piperidyl)-5 beta-bisnorcholane-3-one in about 50 ml. ether, there separate out 400 mg. 22 - (N-piperidyl)-5 beta-bis-norcholane-3-one-hydrochloride as a white, crystalline precipitate, which after drying in vacuum melts at 254/268–271 deg. C.

*Analysis.*—Calculated for $C_{27}H_{45}ClNO$ (percent): N, 3.22; Cl, 8.15. Found (percent): N, 3.18; Cl, 8.25.

EXAMPLE 3

(a) A solution of 15.8 gm. of 5 beta-bisnorcholane-22-al, 64 mg. p-toluene-sulfo-acid and 7.5 ml. of freshly distilled piperidine in 375 ml. of absolute benzene are heated for 3 hours under reflux, using a water separator. After cooling the benzene phase is washed several times with water, dried with sodium sulfate and evaporated under reduced pressure. After recrystallization from acetone, one obtains 17.3 gm. of 22-(N-piperidyl)-delta$^{20}$(22)-5 beta-bisnorcholene with a melting point of 104/106–109° C.

(b) 4 gm. of 22-(N-piperidyl)-delta$^{20(22)}$-5 beta-bisnorcholane are dissolved in 300 ml. glacial acetic acid and hydrogenated with 400 mg. of platinum oxide as a catalyst. After this, the reaction product is suctioned from the catalyst, the filtrate is stirred into ice water and reacted dropwise while stirring with dilute sodium hydroxide up to a weakly alkaline reaction. The hydrogenated reaction product flocculates or separates out during this, which is isolated with methylenechloride. The methylenechloride phase washed with water and dried with sodium sulfate is concentrated to dryness under reduced pressure and one obtains 3.8 gm. 22-(N-piperidyl)-5 beta-bisnorcholane.

(c) By introducing hydrogen chloride into a solution of 3.8 gm. of 22-(N-piperidyl)-5 beta-bisnorcholane in about 150 ml. ether, there separate out 4.1 gm. 22-(N-piperidyl)-5 beta-bis-norcholane-hydrochloride as a white, crystalline precipitate, which after drying in vacuum melts at 264/269–275° C.

*Analysis.*—Calculated for $C_{27}H_{48}ClN$ (percent): N, 3.32; Cl, 8.40. Found (percent): N, 3.33; Cl, 8.40.

EXAMPLE 4

(a) A solution of 5 gm. 3 alpha-acetoxy-5 beta-bisnorcholane-22-al, 21 mg. p-toluene sulfo-acid and 2.5 ml. freshly distilled morpholine in 120 ml. absolute benzene are heated for 3 hours under reflux, using a water separator. After cooling, the benzene phase is washed several times with water, dried with sodium sulfate and concentrated under reduced pressure. One obtains 5.5 gm. of 3 alpha-acetoxy-22 - (N-morpholino)-delta$^{20(22)}$-5 beta-bisnorcholane.

*Analysis.*—Calculated for $C_{28}H_{45}NO_3$ (percent): N, 3.16. Found (percent): N, 3.11.

(b) 5.5 gm. of 3 alpha-acetoxy - 22-(N-morpholino)-delta$^{20(22)}$-5 beta-bisnorcholane are dissolved in 350 ml. of glacial acetic acid and hydrogenated with 550 mg. of platinum oxide as catalyst. After this, the reaction product is suctioned from the catalyst the filtrate stirred into ice water and reacted dropwise while stirring with dilute sodium hydroxide up to a weakly alkaline reaction. In this, the hydrogenated reaction product flocculates or separates out, which is isolated with methylenechloride. The methylenechloride phase washed with water and dried with sodium sulfate is evaporated to dryness under reduced pressure and one obtains 5.2 gm. 3 alpha-acetoxy-22-(N-morpholino)-5 beta-bis-norcholane.

(c) By introducing hydrogen chloride into a solution of 5.2 gm. of 3 alpha-acetoxy-22-(N-morpholino)-5 beta-bisnorcholane in about 200 ml. ether there separate 5.5 gm. of 3 alpha-acetoxy-22 - (N-morpholino)-5 beta-bisnorcholane-hydrochloride as a white, crystalline precipitate, which after drying in vacuum melts at 235/240–248 deg. C.

*Analysis.*—Calculated for $C_{28}H_{48}ClNO_3$ (percent): N, 2.91; Cl, 7.38. Found (percent): N, 2.87; Cl, 7.31.

(d) 3.6 gm. 3 alpha-acetoxy - 22-(N-morpholino)-5 beta-bisnorcholane are heated with 175 ml. of 4% solution of methanolic potassium hydroxide for ¾ hour under reflux. The reaction mixture is stirred into ice water and the saponification product is isolated by extraction with methylenechloride. The methylenechloride extracts are washed neutral with water and dried with sodium sulfate. After evaporation under diminished pressure, the yield is 3.4 gm. 22-(N-morpholino)-5 beta-bisnorcholane-3 alpha-ol.

(e) By introducing hydrogen chloride into a solution of 3.4 gm. of 22-(N-morpholino)-5 beta-bisnorcholane-3 alpha-ol in about 150 ml. of ether, there separate 3.8 gm. of 22-(N-morpholino)-5 beta-bisnorcholane-3 alpha-ol-hydrochloride as a white, crystalline, precipitate, which after drying in vacuum melts at 235/240–250° C.

*Analysis.*—Calculated for $C_{26}H_{46}ClNO_2$ (percent): N, 3.18; Cl, 8.06. Found (percent): N, 3.02; Cl, 8.16.

EXAMPLE 5

(a) A solution of 5 gm. of 3 alpha-acetoxy-5 beta-bisnorcholane-22-al, 25 mg. p-toluene sulfo-acid, 2.5 ml. freshly distilled pyrrolidine in 120 ml. absolute benzene are heated for 3 hours under reflux, using a water separator. After cooling, the benzene phase is washed several times with water, dried with sodium sulfate and concentrated under reduced pressure. One obtains 4.3 gm. of 3 alpha-acetoxy-22-(N-pyrrolidine)-delta$^{20(22)}$-5 beta-bisnorcholene.

(b) 4.3 gm. of 3 alpha-acetoxy-22-(N-pyrrolidino)-delta$^{20(22)}$-bisnorcholene are dissolved in 300 ml. gacial acetic acid and hydrogenated with 450 mg. platinum oxide as catalyst. After this, the reaction product is suctioned from the catalyst, the filtrate is stirred into ice water and reacted dropwise while stirring with dilute sodium hydroxide up to weakly alkaline reaction. In this, the hydrogenated reaction product flocculates, or separates which is isolated with methylenechloride. The methylenechloride phase is washed neutral with water and dried with sodium sulfate and is concentrated to dryness under reduced pressure. One obtains 3.7 gm. of 3 alpha-acetoxy-22-(N-pyrrolidibo)-5 beta-bisnorcholane.

(c) 3.7 gm. of 3 alpha-acetoxy-22-(N-pyrrolidino)-5 beta-bisnorcholane are heated with 180 ml. of 4% solution of methanolic potassium hydroxide for ¾ hours under reflux. After cooling, the reaction mixture is stirred into ice water and the saponification product is isolated by extraction with methylenechloride. The methylenechloride extracts are washed neutral with water and dried with sodium sulfate, and after concentration under diminished pressure yield 3.24 of gm. 22-(N-pyrrolidino)-5 beta-bisnorcholane-3 alpha-ol.

(d) By introducing hydrogen chloride gas into a solution of 3.24 gm. of 22-(N-pyrrolidino)-5 beta-bisnorcholane-3 alpha-ol in about 150 ml. ether there separate out 3.4 gm. 33-(N-pyrrolidino)-5beta-bisnorcholane-3 alpha-ol-hydrochloride as a white crystalline precipitate, which after drying in vacuum melts at 230/238–248° C.

*Analysis.*—Calculated for $C_{28}H_{46}ClNO$ (percent): N, 3.30; Cl, 8.36. Found (percent): N, 3.16, Cl, 8.36.

EXAMPLE 6

(a) A solution of 5 gm. 3 alpha-acetoxy-5 beta-bisnorcholane-22-al, 21 mg. of p-toluene sulfo-acid, 50 ml. of freshly distilled diethylamine and 50 ml. of absolute ether is heated for about 8 hours under reflux. After cooling, the reaction solution is filtered, washed several times with water, dried with sodium sulfate and concentrated under reduced pressure. One obtains 4.2 gm. of 3 alpha-acetoxy-22-(N-diethylamino)-delta$^{20(22)}$-5 beta-bisnorcholene.

*Analysis.*—Calculated for $C_{25}H_{47}NO_2$ (percent): N, 3.26. Found (percent): N, 3.23.

(b) 4.2 gm. 3 alpha-acetoxy-22-(N-diethylamino)-delta $^{20(22)}$-5 beta-bisnorcholene are dissolved in 300 ml. of glacial acetic acid and hydrogenated with 450 mg. platinum oxide as catalyst. After this, the reaction product is suctioned from the catalyst, the filtrate is stirred into ice water and reacted dropwise while stirring with dilute sodium hydroxide up to weakly alkaline reaction. In this, the hydrogenated reaction product flocculates or separates out, which is isoluated with methylenechloride. The methylenechloride phase is washed neutral with water and dried with sodium sulfate. It is concentrated to dryness under reduced pressue. The product is 3.6 gm. 3 alpha-acetoxy-22-(N-diethylamino)-5 beta-bisnorcholane.

(c) 3.6 gm. 3 alpha-acetoxy-22-(N-diethylamino)-5 beta-bisnorcholane are heated with 180 ml. of 4% solution of methanolic potassium hydroxide for ¾ hours under reflux conditions. After cooling, the reaction mixture is stirred into ice water and the saponification product is isolated by extraction with methylenechloride. The methylenechloride extracts are washed neutral with water and then dried with sodium sulfate. After concentration under reduced pressure the yield is 3.1 gm. 22-(N-diethylamino)-5 beta-bisnorcholane-3 alpha-ol.

(d) By introducing hydrogen chloride into a solution of 3.1 gm. of 22-(N-diethylamino)-5 beta-bisnorcholane-3 alpha-ol in about 150 ml. ether there separate 3.2 gm. 22-(N-diethylamino)-5 beta-bisnorcholane-3 alpha-ol-hydrochloride as a white, crystalline precipitate, which after drying in vacuo melts at 180/186–192° C.

*Analysis.*—Calculated for $C_{26}H_{48}ClNO$ (percent): N, 3.29; Cl, 8.32. Found (percent): N, 3.10; Cl, 7.96.

EXAMPLE 7

(a) 6.45 gm. 3 alpha-acetoxy-5 beta-bisnorcholane-22 acid are suspended in 135 ml. anhydrous benzene, reacted with 3.2 ml. thionylchloride and 0.1 ml. pyridine and stirred for one hour at room temperautre. The clear reaction solution is then concentrated to dryness under reduced pressure whereby 3 alpha-acetoxy-5 beta-bisnorcholane-22-acid chloride is obtained which can be processed further in this form without further purification.

(b) 6.75 gm. of crude 3 alpha-acetoxy-5 beta-bisnorcholane-22-acid chloride are dissolved in 200 ml. tetrahydrofurane, filtered from a precipitated contamination and the clear solution thus obtained is dropped with stirring and ice cooling into 200 ml. of aqueous ammonia. The mix is diluted with 2 liter ice water, and the resultant precipitate, 3 alpha-acetoxy-5 beta-bisnorcholane-22-acid amide is suctioned off, washed, dried and recrystallized from isopropanol. One obtains 5.26 gm. with M.P. 188.5–189.5° C.

(c) 4 gm. of 3 alpha-acetoxy-5 beta-bisnorcholane-22-acid amide are dissolved in 65 ml. tetrahydrofurane and dropped with stirring in to a slurry of 1.5 gm. lithium aluminum hydride in 65 ml. of ether. Subsequently, the reaction mixture is heated with stirring and under nitrogen for about twenty hours under reflux. The mix is allowed to cool and the excess lithium aluminum hydride is decomposed with acetone. 100 ml. of water are then added, the precipitate which has come down is suctioned off, rewashed with ether and methylenechloride and the organic phase is separated, washed, dried and concentrated to dryness. The yield is 3.25 gm. of 22-amino-5 beta-bisnorcholane-3 alpha-ol with M.P. 197–198° C.

(d) Into a solution of 1.5 gm. of 22-amino-5 beta-bisnorcholane-3 alpha-ol in dry ether dry hydrogen chloride is introduced with stirring and ice cooling. The precipitated 22-amino-5-beta-bisnorcholane-3 alpha-ol-hydrochloride is suctioned off and dried. One obtains 1.4 gm. with M.P. 332–334° C. (decomposition)

EXAMPLE 8

(a) 1.5 gm. 3 alpha-acetoxy-5 beta-bisnorcholane-22-acid are converted similarly as in example 7 into 3 alpha-acetoxy-5 beta-bisnorcholane-22-acid chloride. The acid chloride thus obtained is then dissolved in 30 ml. of benzene and put into a solution of 2 ml. piperidine in 10 ml. benzene. The reaction solution is then left to stand at 50° C. for one hour. After this, it is allowed to cool to room temperature and diluted with 60 ml. benzene. The reaction mixture is then poured into 300 ml. ice water, the benzolic phase is separated, washed with water, 2 *n* HCl and water, dried over sodium sulfate and concentrated to dryness under diminished pressure. The residue, after filtration over a 10-fold quantity of silica gel is recrystallized from hexane. One obtains 1.3 gm. of 3 alpha-aceotxy-5 beta-bisnorcholane-22-acid piperidide with M.P. 151.5–152° C.

(b) 1.3 gm. of 3 alpha-acetoxy-5 beta-bisnorcholane-22-acid piperidide are dissolved in 40 ml. of tetrahydrofurane, poured into a suspension of 0.4 gm. lithium aluminum hydride in 30 ml. ether and treated further and processed similarly to Example 7(c). The resultant 22-(N-piperidyl)-5 beta-bisnorcholane-3 alpha-ol is recrystallized from hexane. One obtains 1.1 gm. with M.P. 153–154° C.

(c) Into a solution of 1.5 gm. of 22-(N-piperidyl)-5 beta-bisnorcholane-3 alpha-ol in 120 ml. of dry ether are introduced with stirring and ice cooling, dry hydrogen chloride in excess. The resultant precipitate is suctioned off, washed with ether and dried. 1.55 gm. of 22-(N-piperidyl)-5 beta-bisnorcholane-3 alpha-ol hydrochloride with M.P. 324–326° C. (decomposition) are obtained.

(d) To 110 mg. of 22-(N-piperidyl)-5 beta-bisnorcholane-3 alpha-ol in 10 ml. ether is added a solution of 37.8 mg. salicylic acid in 2 ml. ether. The reaction mixture is stirred for one hour at room temperature. After this, the resultant precipitate is suctioned off, washed two times with 2 ml. ether and dried. 108 mg. of 22-(N-piperidyl)-5 beta-bisnorcholane-3 alpha-ol-salicylate with M.P. 198–200° C. (decomposition) are obtained.

(e) 0.3 gm. of 22-(N-piperidino)-5 beta-bisnorcholane-3 alpha-ol are heated with 3 ml. of methyliodide for one hour under reflux. After this 20 ml. of methanol are added and heated for an additional hour under reflux. Subsequently, the mix is concentrated to dryness under reduced pressure and the residue recrystallized from ethanol. 240 mg. 22-(N-piperidino)-5 beta-bisnorcholane-3 alpha-ol methiodide with M.P. 283° C. (decomposition) are obtained.

EXAMPLE 9

(a) Similarly to Example 7(a) one obtains the 5-beta-bisnorchlorane-3-one-22-acid chloride from 2 gm. 5 beta-bisnorcholane-3-one-22-acid. This is then reacted analogously to Example 8(a), with piperidine into 5 beta-bisnorcholane-3-one-22-acid piperidide, which after reduction with lithium aluminum hydride under the conditions of Example 8(b), yields 0.6 gm. of mixture of 22-(N-piperidyl)-5 beta-bisnorcholane-3 alpha-ol and 22-(N-piperidyl) 5 beta-bisnorcholane-3 beta-ol.

(b) 0.6 gm. of mixture of 22-(N-piperidyl)-5 beta-bisnorcholane-3 alpha-ol and 22-(N-piperidyl)-5 beta bisnorcholane-3 beta-ol are dissolved in 86 ml. toluene and reacted with 2.06 ml. cyclohexanone. Subsequently this is distilled until a clear distillate comes over. To the boiling solution is added a solution of 0.6 gm. of aluminum isopropylate in 5 ml. toluene. This all is heated for 40 minutes under reflux. After cooling to 50° C. one adds 0.95 gm. Rochelle salt in 1 ml. water and stirs for one more hour. Then one distills with steam until no more oil comes over. After the reaction mixture has cooled to 50° C., one stirs for ½ hour after the addition of 0.6 ml. glacial acetic acid. The oxidation product is washed neutral with water, dried over sodium sulfate and concentrated under diminished pressure. After recrystallization from isopropanol/water solution one obtains 0.39 gm. 22-(N-piperidyl)-5 beta-bisnorcholane-3-one with M.P. 114–115° C.

(c) By introducing hydrogen chloride into a solution of 0.37 gm. 22-(N-piperidyl)-5 beta bisnorcholane-3-one in ether there separate out 0.4 gm. of 22-(N-piperidyl)-5 beta-bisnorcholane-3-one hydrochloride as a white crystalline precipitate, which after being suctioned and dried melts at 290–296 C. (decomposition).

EXAMPLE 10

0.66 gm. of 22-(N-piperidyl)-5 beta-bisnorcholane-3 alpha-ol are oxidized analogously to Example 9(b) and processed. After recrystallization from isopranol/water solution, 0.45 gm. of 22-(N-piperidyl)-5 beta-bisnorcholane-3-one with M.P. 114–115° C. are obtained.

EXAMPLE 11

(a) The 3 alpha-acetoxy-5 beta-bisnorcholane-22-acid chloride obtained analogously to Example 7(a) from 2 gm. 3 alpha-acetoxy-5 beta-bisnorcholane-22-acid is dissolved in 20 ml. of benzene and added to a solution of 2 gm. of aniline in 10 ml. of benzene. The reaction mixture is then left at 50° C. for one hour with stirring and allowed to cool. After cooling the mix is stirred and poured into water. The organic phase is separated, washed with water, dilute hydrochloric acid and again with water, dried over sodium sulfate and the solvent is distilled off under reduced pressure. The residue is recrystallized from isopropanol and one obtains 1.8 gm. 3 alpha-acetoxy-5 beta-bisnorcholane-22-acid anilide with M.P. 260–262° C.

(b) 1 gm. 3 alpha-acetoxy-5 beta-bisnorcholane-22-acid anilide is reduced with lithium aluminum hydride in a manner similar to Example 7(c) and processed. One obtains 2-phenylamino-5 beta-bisnorcholane-3 alpha-ol.

(c) 0.2 gm. crude 22-phenylamino-5 beta-bisnorcholane-3 alpha-ol are dissolved in 30 ml. tetrahydrofuran and saturated at 0° C. with dry hydrogen chloride gas. After the solution stands overnight the 22-phenylamino-5 beta-bisnorcholane-3 alpha-ol hydrochloride crystallizes out, which is suctioned off, washed with ether and dried. One obtains 0.11 gm. with M.P. 245–247°C. (decomposition).

EXAMPLE 12

In a manner similar to Example 8(a), the 3 alpha-acetoxy-5 beta-bisnorcholane-22-acid chloride obtained from 1.5 gm. 3 alpha-acetoxy-5 beta-bisnorcholane-22-acid is converted with 2 ml. of morpholine into the 3 alpha-acetoxy-5 beta-bisnorcholane-22-acid morpholide, which is reduced analogously to Example 8(b) to 22-(N-morpholino)-5 beta-bisnorcholane-3 alpha-ol. From this one obtains analogously to Example 8(c) 0.8 gm. 22-(N-morpholino)-5 beta-bisnorcholane-3 alpha-ol hydrochloride with M.P. 240–250° C.

EXAMPLE 13

In a manner similar to Example 8(a), the 3 alpha-acetoxy-5 beta-bisnorcholane-22-acid chloride obtained from 1.5 gm. 3 alpha-acetoxy-5 beta-bisnorcholane-22-acid is converted with 2 ml. pyrrolidine into the 3 alpha-acetoxy-5 beta-bisnorcholane-2-acid pyrrolidine, which is reduced analogously to Example 8(b), to the 22-(N-pyrrolidino)-5 beta-bisnorcholane-3-alpha-ol. From this is obtained, analogously to Example 8(b) 0.75 gm. of 22-(N - pyrrolidino)-5 beta-bisnorcholane-3 alpha-ol-hydrochloride with M.P. 238–248° C.

EXAMPLE 14

In a manner similar to Example 8(a), the 3 alpha-acetoxy-5 beta-bisnorcholane-22-acid chloride obtained from 1.5 gm. 3 alpha-acetoxy-5 beta-bisnorcholane-22-acid is converted with 2 ml. diethylamine into the 3 alpha-acetoxy-5 beta-bisnorcholane-22-acid diethylamide, which is reduced, analogously to Example 8(b), to the 22-(N-diethylamine)-5 beta-bisnorcholane- 3 alpha-ol. From this, are then obtained analogously to Example 8(c), 0.76 of gm. 22-(N-diethylamino)-5 beta-bisnorcholane-3 alpha-ol hydrochloride with M.P. 186–192° C.

EXAMPLE 15

(a) Analogously to Example 7(a), 3 gm. of 5 beta-bisnorcholane-22-acid (M.P. 209–211° C., prepared from 5 beta-bisnorcholane-22-al by oxidation with chromic acid) are converted to 5 beta-bisnorcholane-22-acid chloride, which is then reacted analogously to Example 7(b) with ammonia and processed. After recrystallization from isopropylether of 2.4 gm. of 5 beta-bisnorcholane-22-acid amide with M.P. 200–200.5° C. are obtained.

(b) 1 gm. of 5 beta-bisnorcholane-22-acid amide is reduced, analogously to Example 7(c), and processed. After recrystallization from isopropanol/water, 0.7 gm. of 22-amino 5 beta-bisnorcholane with M.P. 113–115° C. are obtained.

(c) Analogously to Example 7(d), 0.155 of gm. 22-amino-5 beta - bisnorcholane-hydrochloride with M.P. 295–300° C. (decomposition) are obtained from 0.15 gm. 22-amino-5 beta-bisnorcholane.

EXAMPLE 16

The 5 beta-bisnorcholane-22-acid chloride as obtained analogously in Example 15(a) from 2.5 gm. of 5 beta-bisnorcholane-22-acid is converted in a manner analogous to Example 8(a) with 2.5 ml of piperidine into the 5 beta-bisnorcholane-22-acid piperidide and reduced further similar to Example 8(b) with lithium aluminum hydride and processed. The crude 22-(N-piperidyl)-5-beta-bisnorcholane thus obtained is dissolved in ether and the 22-(N-piperidyl)-5 beta-bisnorcholane-hydrochloride is precipitated by introducing hydrogen chloride. After suctioning and drying, 1.6 gm. with M.P. 269–275° C. are obtained.

EXAMPLE 17

(a) 1 gm. delta⁴-bisnorcholene-22-ol-3-one are dissolved in 12 ml. pyridine, reacted with a solution of 2 gm. of p-toluene sulfochloride in 2 ml. pyridine while cooling with ice, and allowed to stand for 2 hours at room temperature.

For processing, the reaction mixture is stirred with dilute hydrochloric acid, and the resultant precipitate is suctioned off, washed first with dilute hydrochloric acid, and then continued to neutrality with water. After recrystallization from acetone 960 mg. delta⁴-bisnorcholene-22-ol-3-one-22-p-tosylate are obtained which melts at 167–172° C.

(b) 100 mg. of delta⁴-bisnorcholene-22-ol-3-one-22-p-tosylate are dissolved in a mixture of 1 ml. of piperidine and 1 ml. of acetone and left to stand at room temperature overnight.

For processing, this mixture is stirred with dilute hydrochloric acid, the hydrochloric acid solution is extracted several times with ether, then made alkaline with dilute sodium hydroxide and the precipitated product is extracted with ether. The ether phase, after it is washed neutral and dried over sodium sulfate, is concentrated to dryness. The crude product after recrystallization from ethanol/water yields 80 mg. of 22-(N-piperidyl)-delta⁴-bisnorcholene-3-one with melting point 160–162° C.:

UV: Epsilon $_{242}$=16,000.

(c) In a manner similar to Example 8(c), 87 mg. 22 - (N-piperidyl)-delta⁴-bisnorcholene - 3 - one-hydrochloride with M.P. 286–288° C. (decomposition) are obtained from 100 mg. of 22-(N-piperidyl)-delta⁴-bisnorcholene-3-one;

UV: Lambda$_{max}$=242 m-mu, epsilon=15,000.

EXAMPLE 18

200 mg. of 22-amino-5-beta-bisnorcholane-3 alpha-ol are dissolved in 5 ml. ether and 166 mg. of 1,5-dibromopentane and 140 mg. of anhydrous sodium carbonate are added. The reaction mixture is heated for 16 hours with stirring and under reflux. The resultant mix is allowed to cool. 20 ml. of ethanol are added and the inorganic components are suctioned off. The filtrate is concentrated to dryness and the residue obtained is dissolved in ether. The insoluble residue is suctioned and the other solution concentrated to dryness. The 22-(N-piperidyl)-5 beta-bisnorcholane-3 alpha-ol which resmains behind is re-crystallized from hexane. 120 mg. with a M.P. 153–154° C. are obtained.

EXAMPLE 19

(a) A mixture of 11.8 gm. of bisnor-5 beta-cholane-3 alpha-ol-22-al-3-acetate, 285 ml. of benzene, 5.9 ml. of freshly distilled piperidine and 50 mg. p-toluo-sulfo-acid are heated for 3 hours under reflux with a water separator. After cooling about ½ liter water are added and shaken through. The benzene phase is then separated and washed neutral with water. After drying over sodium sulfate and filtering, it is concentrated in vacuum. One obtains 11.35 gm. substance. This paste is stirred cold with methanol, suctioned off and dried. One thus obtains 5.60 gm. of 22-(N-piperidyl)-delta$^{20(22)}$-bisnor-5 beta-cholane-3 alpha-ol-3 acetate with M.P. 108–111° C.

(b) The 5.60 gm. enamine from (a) are dissolved in 26 ml. of absolute benzene and dripped with stirring into 185 ml. ether saturated with HCl. The precipitated hydrochloride is carefully suctioned off and well washed with ether and dried. One obtains 4.43 gm. enamine-hydrochloride with M.P. 111–113° C. (decomposition).

(c) The 4.43 gm. enamine-hydrochloride from (b) are dissolved in about 1 liter water allowed to stand overnight. A substance precipitates during this. After suctioning and drying, one obtains 3.42 gm. of 20 alpha-bisnor-5 beta-cholane-3 alpha-ol-22-al-3-acetate, which after recrystallization from isopropylether melts at 119–120° C.; (alpha)$_D$ 49° (CHCl$_3$).

(d) 3.20 gm. of 20 alpha-bisnor-5 beta-cholane-3 alpha-ol-22-al-3-acetate are hydrogenated in 200 ml. ethanol in the presence of Raney nickel catalyst.

After the hydrogen absorption is concluded, the product is then filtered from the catalyst under nitrogen and the filtrate is concentrated in vacuum. There are obtained 3.2 gm. of crude product (M.P. 103–107° C.). After recrystallization with isopropylether 20 alph-bisnor-5 beta-cholane-3 alpha, 22-diol-3-acetate is obtained, having a melting point 114.5–116° C.

(e) 1.70 gm. alpha-bisnorcholane-3 alpha, 22-diol-3-acetate are dissolved in 18.5 ml. of absolute pyridine, 1.07 gm. toluene sulfochloride are then added. The mix is allowed to stand at room temperature for 3 hours. Then the reaction mixture is poured into about 200 ml. ether, the organic solution is washed with hydrochloric acid and water, dried over sodium sulfate and concentrated to dryness in vcuum. After grinding up with methanolone obtains 1.0 gm. of 20 alpha-bisnor-5 beta-cholane-3 alpha, 22-diol-3-acetate-22 tosylate with melting point 130–132° C. which after recrystallization from methanol melts at 133.5–134.5° C.

(f) 550 mg. tosylate are dissolved in 7 ml. absolute acetone, then a solution of 800 mg. of NaI in 5 ml. acetone is added and heated for 3 hours under reflux and with stirring. After about 3 hours, the reaction mixture is poured into water and extracted with ether. The ether phase is washed twice with water and dried over sodium sulfate. It is then filtered, and the filtrate concentrated in vacuum. One obtains 550 mg. of crude 22-iodo-20 alpha-bisnor-5 beta-cholane-3 alpha-ol-acetate (I calculated=25.3%, found=24.5%).

(g) The 550 mg. iodine compound from (f) of above are heated in 30 ml. freshly distilled piperidine for 3 hours under reflux, and then concentrated in vacuum at 25–30° C. almost to dryness. Ether is added and washed three times with water. After drying the ether phase over sodium sulfate, filtration and concentration of the filtrate there is obtained a residue which, recrystallized from acetone, yields 350 mg. of 22-piperidyl-20 alpha-bisnor-5 beta-cholane-3 alpha-ol-acetate. Melting point 117.5–118° C.

(h) 375 mg. of the amine are boiled in 20 ml. of 4% methanolic KOH for ¾ hour in a stream of N$_2$ under reflux. The mix is there acidified with acetic acid, and precipitated in water. There is obtained after suctioning, 300 mg. crude of 22-piperidyl-20 alpha-bisnor-5-beta-cholane-3 alpha-ol. Recrystallized from hexane, the pure compound shows a melting point of 151–152° C.

EXAMPLE 20

(a) 2 gm. of delta⁴-bisnorcholane-22-ol-3-one tosylate are suspended in 28 ml. acetone, after which a solution of 5 gm. of NaI in 21.5 ml. acetone is added dropwise with stirring. The reaction mixture is heated for 3 hours under reflux and after cooling is poured into ice water. The resultant precipitate is suctioned off and dried. The crude 22-iodo-delta⁴-bisnorcholene-22-ol-3-one thus obtained is homogeneous in the thin layer chromatogram and has an iodine content of 29.0% (calculated 28.8% with a yield of 2.1 gm.).

(b) 500 mg. of the above noted crude 22-iodine compound are dissolved in 1 ml. piperidine and 12 ml. acetone and heated for 4 hours under reflux. The solvent is then extracted in vacuum and the residue is dissolved in ether and washed with water. It is then dried over sodium sulfate and concentrated. The 22-piperidyl-delta⁴-bisnorcholene-3-one thus obtained after recrystallization from hexane, melts at 162–164° C.

(c) 100 mg. of the amine thus obtained are dissolved in 10 cc. dry ether and hydrochloric acid gas is then introduced. The precipitated 22-piperidyl-delta⁴-bisnorcholene-3-one-hydrochloride is now suctioned off and dried. The melting point of the precipitate is 286–688° C.; Cl found=Theory: 8.2%.

EXAMPLE 21

(a) The 3 alpha-acetoxy-5-bet-bisnorcholane-22-acid chloride obtained from Example 7(a), from 1.5 gm. of 3 alpha-acetoxy-5 beta-bisnorcholane-22-acid is reacted with an excess of aqueous monomethylamine solution under the conditions of Example 7(b), and processed. After recrystallization from acetone 1.04 gm. of 3 alpha-acetoxy-5 beta-bisnorcholane-22 - acid N-methylamide with melting point 199–200° C. are obtained.

(b) 0.8 gm. 3 alpha-acetoxy-5 beta-bisnorcholane-22-acid-N-methylamide are treated similarly as in Example 7(c) with lithium aluminum hydride and processed. After recrystallization from acetone, 0.3 gm. of 22-n-methylamino-5 beta-bisnorcholane-3 alpha-ol with a melting point of 177–178° C. is obtained.

(c) 0.13 gm. of 22-N-methylamino-5 beta-bisnorcholane-3 alpha-ol is dissolved in 20 ml. of tetrahydrofuran and reacted with 10 ml. ether saturated with hydrogen chloride gas. The precipitated 22-N-methylamino-5 beta-bisnorcholane-3 alpha-ol-hydrochloride is suctioned off, washed with ether and dried. 0.1 gm. with a melting point 328–329° C. (decomposition) is obtained.

EXAMPLE 22

(a) The 3 alpha-acetoxy-5 beta-bisnorcholane-22-acid chloride obtained analogously from Example 7(a), from 1.5 gm. 3 alpha-acetoxy-5 beta-bisnorcholane-22-acid is reacted as in Example 8(a) in benzene with 2 ml. of 1,2,3,4-tetrahydroquinoline into 3 alpha-acetoxy-5-beta-bisnorcholane-22-acid 1,2,3,4-tetrahydroquinolide. After recrystallization from hexane, 1.2 gm. with a melting point of 176–176.5° C. are obtained.

(b) 1 gm. of 3 alpha-acetoxy-5 beta-bisnorcholane-22-acid-1,2,3,4-tetrahydroquinolide are reduced as in Example 8(c), to 22-(N,1,2,3,4-tetrahydroquinolino)-5 beta-bisnorcholane-3 alpha-ol. After recrystallization from hexane, 0.68 gm. with a melting point of 182–183° C. are obtained.

(c) From 0.2 gm. of 22-(N-1,2,3,4-tetrahydroquinolino)-5 beta-bisnorcholane-3 alpha-ol are obtained such as in Example 8(c), 0.2 gm. 22-(1,2,3,4-tetrahydroquinolino)-5 beta-bisnorcholane-3 alpha-ol-hydrochloride is obtained with a melting point of 214–216° C. (decomposition).

EXAMPLE 23

(a) The 3 alpha-acetoxy-5-beta-bisnorcholane-22-acid chloride obtained such as from Example 7(a), from 1.5 gm. of 3 alpha-acetoxy-5 beta-bisnorcholane-22-acid is reacted as in Example 8(a), with 2 ml. of 1,2,3,4-tetrahydroisoquinoline into 3 alpha-acetoxy-5 beta-bisnorcholane-22-acid-1,2,3,4-tetrahydroisoquinolide. After recrystallization from hexane, 1.4 gm. with a melting point 153–155° C. are obtained.

(b) 1.35 gm. of 3 alpha-acetoxy-5- beta-bisnorcholane-22-acid-1,2,3,4-tetrahydroisoquinolide are reduced as in Example 8(c) to 22-(N,1,2,3,4-tetrahydroisoquinolino)-5 beta-bisnorcholane-3 alpha-ol. After recrystallization from acetone, 1.2 gm. with melting point 115–117° C. are obtained.

(c) From 0.2 gm. 22-(N,1,2,3,4-tetrahydroisoquinolino)-5 beta-bisnorcholane-3 alpha-ol are obtained as in Example 8(c), 0.2 gm. of the hydrochloride with melting point 287–288° C. (decomposition).

EXAMPLE 24

(a) The 3 alpha-acetoxy-5 beta-bisnorcholane-22-acid chloride obtained as in Example 7(a), from 1.5 gm. of 3 alpha-acetoxy-5 beta-bisnorcholane-22-acid is reacted as in Example 8(a) with 2 ml. of 2-methylpiperidine into 3 alpha-acetoxy-5-beta - bisnorcholane-22-acid-2-methylpiperidide. After recrystallization from hexane, 0.9 gm. with a melting point of 151–152° C., is obtained.

(b) 0.8 gm. of 3 alpha-acetoxy-5 beta-bisnorcholane-22-acid-2-methylpiperidide are reduced similarly to Example 8(c), to the 22-(N-2-methylpiperidino)-5 beta-bisnorcholane-2 - alpha-ol. After recrystallization from acetone, 0.6 gm. with melting point 136–137° is obtained.

(c) From 0.2 gm. of 22-(N-2-methylpiperidino)-5 beta-bisnorcholane-3 alpha-ol are obtained in a manner similar to Example 8(c), 0.2 gm. hydrochloride with a melting point of 320–322° C. (decomposition).

EXAMPLE 25

(a) The 3 alpha-acetoxy-5 beta-bisnorcholane-22-acid chloride obtained such as in Example 7(a) from 1.5 gm. 3 alpha-acetoxy-5 beta-bisnorcholane-22-acid is reacted in a manner similar to Example 8(a) with 2 ml. of 3-methylpiperidine to the 3 alpha-acetoxy-5 beta-bisnorcholane-22-acid-3 methylpiperidide. After recrystallization from hexane 1.25 gm. with a melting point of 131–132° C. are obtained.

(b) 1.15 gm. of 3 alpha-acetoxy-5 beta-bisnorcholane-22-acid-3-methyl-piperidide are reduced analogously as in Example 8(c), to 22-(N-3-methylpiperidino-5 beta-bisnorcholane - 3 alpha-ol. After recrystallization from acetone, 0.9 gm. with a melting point 131–133° C. is obtained.

(c) From 0.2 gm. of 22-(N-3-methylpiperidino)-5 beta-bisnorcholane-3 alpha-ol are obtained analogously to Example 8(c) 0.21 gm. heptochloride with melting point 314–315° C. (decomposition).

EXAMPLE 26

(a) 3 alpha-acetoxy-5 beta-bisnorcholane-22-acid chloride obtained as from Example 7(a), from 1.5 gm. of 3 alpha-acetoxy-5 beta-bisnorcholane-22-acid is reacted analogously as in Example 8(a), with 2 ml. of 4-methylpiperidine to 3 alpha-acetoxy-5 beta-bisnorcholane-22-acid-4-methylpiperidide. After recrystallization from hexane, 1.2 gm. with a melting point 151–152° C. are obtained.

(b) 1.1 gm. of 3 alpha-acetoxy-5 beta-bisnorcholane-22-acid-4-methylpiperidide are reduced analogously to Example 8(c), to 22-(N-4-methylpiperidino)-5 beta-bisnorcholane-3 alpha-ol. After recrystallization from acetone, 0.8 gm. with a melting point of 138–139° C. is obtained.

(c) From 0.2 gm. 22-(N-4-methylpiperidino)-5 beta-bisnorcholane-3-alpha-ol are obtained in a manner analogous to Example 8(c), 0.19 gm. hydrochloride with a melting point of 320–321° C. (decomposition).

EXAMPLE 27

(a) The 3 alpha-acetoxy-5 beta-bisnorcholane-22-acid chloride obtained as in Example 7(a) from 1.5 gm. of alpha-acetoxy-5 beta-bisnorcholane-22-acid is reacted as in Example 8(a) with 2 ml. of 2, 6-dimethyl-piperidine to 3 alpha-acetoxy-5 beta-bisnorcholane-22-acid-2, 6-dimethyl-piperidide. After recrystallization from hexane 1.3 gm. with a melting point 162–163° C. are obtained.

(b) 1.2 gm. of 3 alpha-acetoxy-5 beta-bisnorcholane-22-acid-2, 6-dimethyl-piperidide are reduced analogously to Example 8(c), to 22-(N-2, 6-dimethyl-piperidino)-5 beta-bisnorcholane-3 alpha-ol. Yield=0.6 gm.

(c) From 0.2 gm. of 22-(N-2, 6 dimethylpiperidino)-5 beta-bisnorcholane-3 alpha-ol are obtained as in Example 8(c) .0.18 gm. of the hydrochloride with melting point 295–297° C. (decomposition)

EXAMPLE 28

As in Example 8(d) 210 mg. of 22-(N-piperidyl)-5 beta-bisnorcholane-3 alpha-ol-3,4,5-trihydroxybenzoate are obtained from 200 mg. of 22-(N-piperidyl)-5 beta-bisnorcholane-3 alpha-ol and 3,4,5-trihydroxybenzoic acid. Melting point 227–228° C. (decomposition)

EXAMPLE 29

In a manner similar to Example 8(d), 205 mg. of 22-(N-piperidyl)-5 beta-bisnorcholane-3 alpha-ol-2-bromobenzoate are obtained from 200 mg. 22-(N-piperidyl)-5 beta-bisnorcholane-3 alpha-ol and 2 bromobenzoic acid. Melting point 190–191° C.

EXAMPLE 30

220 mg. of 22-(N-piperidyl)-5 beta-bisnorcholane-3 alpha - ol-2,3,4-trihydroxybenzoate are obtained in a manner similar to example 8(d) from 200 mg. 22-(N-piperidyl)-5 beta-bisnorcholane-3 alpha-ol and 2,3,4-trihydroxybenzoic acid. Melting point 203–203.5° C. (decomposition).

EXAMPLE 31

Analogous to Example 8(d) 210 mg. of 22-(N-piperidyl)-5 beta-bisnorcholane-3 alpha-ol-2, 6-dihydrozybenzoate are obtained from 220 mg. 22-(N-piperidyl)-5 betabisnorcholane-3 alpha-ol and 2, 6-dihydroxybenzoic acid. Melting point 187–189° C.

EXAMPLE 32

Analogous to Example 8(d) 210 mg. of 22-(N-piperidyl) - 5 beta-bisnorcholane-3 alpha-ol-2,4-dihydroxybenzoate are obtained from 200 mg. of 22-(N-piperidyl)-5 beta-bisnorcholane-3 alpha-ol and 2,4-dihydroxybenzoic acid. Melting point 195–196° C.

EXAMPLE 33

210 mg. of 22-(N-piperidyl)-5 beta-bisnorcholane-3 alpha-ol-2-chlorobenzoate are obtained in a manner set forth in Example 8(d) from 200 mg. of 22-(N-piperidyl)-5 beta-bisnorcholane-3 alpha-ol and 2-chlorobenzoic acid. Melting point 185–187° C.

EXAMPLE 34

(a) To 10 gm. of delta$^4$-bisnorcholene-11 beta-ol-3-one-22 acid methyl ester (prepared from delta$^4$-bisnorcholene-3-one-33-acid by microbiological hydroxylation and subsequent esterification) in 1.2 liters of acetone are slowly dropped 11 ml. of Jones reagent at 150° C. The mix is continuously stirred for one more hour. The excess reagent is destroyed by the addition of methanol and stirring of the reaction mixture in a 5-fold amount of ice water. The resultant precipitated crude delta$^4$-bisnorcholene-3,11-dione-22-acid methyl ester is suctioned off and recrystallized from isopropyl ether. The yield=9.1 gm. Melting point=171–171.5° C.

(b) 9 gm. of delta$^4$-bisnorcholene-3,11-dione-22-acid methyl ester are dissolved in 450 ml. methanol, and reacted with 450 ml. 30% aqueous sodium hydroxide with heating for one hour under reflux. The mix is allowed to cool and with stirring is poured into ice water, acidified. The crude delta$^4$-bisnorcholene-3,11-dione-22-acid is suctioned off. After recrystallization from isopropanol, 6.35 gm. with a melting point of 249–251° C. are obtained.

(c) Analogously to Example 8(a) 0.73 gm. of delta$^4$-bisnorcholene-3,11-dione-22-acid piperidide is obtained from 2 gm. of delta$^4$-bisnorcholene-3,11-dione-22-acid after recrystallization from acetone. Melting point 241–243° C.

(d) 0.65 gm. of 22-(N-piperidyl)-delta$^4$-bisnorcholene-3,11-diol made as in Example 8(b) are obtained from 1.2 gm. delta$^4$ - bisnorcholene-3,11-dione-22-acid piperidide. The hydrochloride has a melting point of 289–291° C. (decomposition).

(e) 0.65 gm. of 22-(N-piperidyl)-delta$^4$-bisnorcholene-3,11 beta-diol are dissolved in 35 ml. benzene and reacted with 0.85 gm. of aluminum isopropylate and 3.5 ml. acetone and stirred for 48 hours at room temperature. After such time, the reaction mixture is distilled with steam until no more oil comes over. After cooling to 50° C., 0.6 ml. of glacial acetic acid are added. One then allows this mix to cool to room temperature wherein the reaction product is picked up in methylenechloride. After washing with water, drying and concentration under reduced pressure, the crude 22-(N-piperidyl)-delta$^4$-bisnorcholene-11-beta-ol-3-one is obtained, which, after recrystallization from acetone, melts at 217–218° C. Yield= 0.35 gm.

(f) Analogously to Example 8(c), 0.21 gm. of the hydrochloride are obtained from 0.22 gm. of 22-(N-piperidyl) - delta$^4$-bisnorcholene-11 beta-ol-3-one, Melting point 298–300° C. (decomposition).

EXAMPLE 35

(a) Analogously to Example 9(b), 10.5 gm. of 22-amino-5 beta-bisnorcholane-3-one-are obtained from 1.6 gm. of 22-amino-5 beta-bisnorcholane-3 alpha-ol after purification through preparative layer chromatography.

(b) 1 gm. of 22-amino-5 beta-bisnorcholane-3-one is dissolved in 120 ml. of tetrahydrofuran and then dry hydrogen chloride is led into the solution with ice cooling. The resultant precipitated hydrchloride is suctioned off, dried and stirred with glacial acetic acid at room temperature. There is thus obtained 0.85 gm. of the hydrochloride which clearly beigns to decompose at 330° C.

Example 36

(a) 1.8 gm. of 5 beta-bisnorcholane-3, 22-diol-3-acetate (prepared from the corresponding aldehyde by hydrogenation with Raney nickel in ethanol, pure melting point from isopropyl ether 140–141.5° C.) are dissolved in 18 cc. of pyridine and reacted with 1.13 gm. of p-toluene sulfo-acid chloride and allowed to stand at room temperature for 3 hours. After the addition of ether, this solution is successively washed with water, hydrochloric acid and water, dried over sodium sulfate and then concentrated to dryness. The crude produce thus formed, is reacted with methanol and the 5 beta-bisnorcholane-3, 22-diol-3-acetate-22-tosylate which then crystallizes out is suctioned off. Yield=1.25 gm.; melting point 97–98° C.

(b) To 1.2 gm. 5 beta-bisnorcholane-3,22-diol-3-acetate-22-tosylate dissolved in 16 cc. acetone are added 1.92 gm. sodium iodide (dissolved in 10 cc. acetone) and heated for 3 hours (under reflux conditions). The cooled reaction mixture, after dilution with ice water, is extracted with ether. After washing with water, the ether solution is dried and concentrated in vacuum to dryness. The crude 22-iodo-5-beta-bisnorcholane-3 alpha-ol-3 acetate (1.1 gm.) thus obtained, exhibits an iodine content of 25.8% (theory 26.1%).

(c) To 1.07 gm. of crude 22-iodo-5 beta-bisnorcholane-3 alpha-ol-3 acetate dissolved in 15 cc. benzene are added 360 mg. imidazol and the reaction mixture is heated for 18 hours under reflux. Then it is diluted with benzene, the solution washed with water, then dried over sodium sulfate and concentrated to dryness in vacuum. After recrystallization from methanol over charcoal, the residue yields 600 mg. of 22-N-imidazolyl-5 beta-bisnorcholane-3 alpha-ol - 3 - acetate with melting point 235–236° C.

(d) 400 mg. of 22-N-imidazolyl-5 beta-bisnorcholane-3 alpha - ol - 3-acetate are heated with 20 cc. of 4% methanolic potassium hydroxide for 45 minutes under reflux. The cooled reaction solution is poured into water and extracted with methylenechloride. After washing with water and drying, the methlenechloride solution is concentrated in vacuum to dryness. The crude 22-N-imidazolyl-5 beta-bisnorcholane - 3 alpha-ol (pure melting point from isopropyl ether, 187–187.5° C.), is dissolved in 5 cc. absolute tetrahydrofuran and reacted with 30 cc. ether which is saturated with gaseous hydrochloric acid. The 22-N-imidazolyl-5 beta-bisnorcholane-3 alpha-ol-hydrochloride that precipitates during this reaction is suctional off and washed with ether. The yield=250 mg. Melting point 240–241° C. Cl calculated=8.43, found=8.62.

Example 37

(a) The 3 alpha-acetoxy - 5 beta-bisnorcholane-22-acid chloride obtained as from Example 7(a), from 2 gm. of 3 alpha-acetoxy-5 beta-bisnorcholane-22-acid is reacted as in Example 11(a), with 2 ml. of benzylamine to 3 alpha-acetoxy-5 beta-bisnorcholane-22-acid—benzylamide. After recrystallization from isopropanol, 1.5 gm. with melting point 226–227° C. are obtained.

(b) 1.5 gm. 3 alpha-acetoxy-5 beta-bisnorcholane-22-acid benzylamide are reduced analogously to Example 11(b) to 22 - (N - benzylamino)-5 beta-bisnorcholane-3 alpha-ol. After processing and recrystallization from acetone/hexane 1.1 gm., with melting point 89–99° C. are obtained.

(c) From 0.9 gm. of 22-(benzylamino)-5 beta-bisnorcholane-3 alpha-ol are obtained by dissolving in ether, introducing dry hydrogen chloride, suctioning the precipitate and treated with acetate 0.8 gm. hydrochloride with melting point 280–282° C. (decomposition).

Example 38

(a) The 3 alpha-acetoxy-5 beta-bisnorcholane-22-acid chloride obtained as in Example 7(a), from 3 gm. of 3 alpha-acetoxy-5 beta-bisnorcholane - 22-acid is reacted analogously to Example 11(a) with 3 ml. of isopropylamine to 3 alpha-acetoxy-5 beta-bisnorcholane-22-acid isopropylamide. After recrystallization from acetone 2.3 gm. with melting point 205–206° C. are obtained.

(b) 2.3 gm. 3 alpha-acetoxy-5 beta-bisnorcholane-22-acid isopropylamide are reduced analogously to Example 11(b), reaction time 5 days, with lithium aluminum hydride to 22-(N-isopropylamino)-5 beta-bisnorcholane-3 alpha-ol. After separation of the contaminations by treatment with ether, 1.3 gm. of 22-(N-isopropylamino)5 beta-bisnorcholane-3 alpha-ol are obtained.

(c) From 1.3 gm. 22-(N-isopropylamino)5 beta-bisnorcholane-3 alpha-ol are obtained according to Example 37(c), 1.1 gm. of hydrochloride with melting point 305–307° C. (decomposition).

From the foregoing description and illustrative examples of our invention, it will be noted that various methods and modifications may be adopted without departing from the spirit and scope of the invention as claimed.

We claim:

1. A medication, containing as active ingredient, a 5-B-bisnorcholane compound of the general formula:

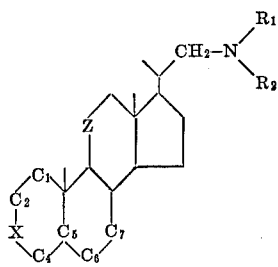

wherein each of $R_1$ and $R_2$ is independently selected from the group consisting of hydrogen, alkyl, aryl, aralkyl, substituted alkyl, aryl and aralkyl, or $R_1$ and $R_2$ taken together form a heterocyclic ring selected from piperidine, morpholine, pyrrolidine, imidozole, substituted piperidine, substituted morpholine substituted pyrrolidine, substituted imidazole, and derivatives thereof; Z is selected from $=CH_2$, $=CH(OH)$, and $=C=O$; X is selected from $=CH_2$, $=CH(OH)$, $=CH(O\ acyl)$, $=C=O$; and $C_1-C_2$, $C_4-C_5$ and $C_6-C_7$ represent single or double bonds; and ammonium salts thereof; $R_1$, $R_2$, X and Z being so selected that the 5-B-bisnorcholane compound is a member selected from the group consisting of 3 alpha-acetoxy-22-(N-piperidyl)-5-beta-bisnorcholane;
22-(N-piperidyl)-5 beta-bisnorcholane-3 alpha-ol;
22-(N-piperidyl)-5 beta-bisnorcholane-3 alpha-ol-hydrochloride;
22-(N-piperidyl)-5 beta-bisnorcholane-3-one;
22-(N-piperidyl)-5 beta-bisnorcholane-3 one-hydrochloride;
22-(N-piperidyl)-5 beta-bisnorcholane;
22-(N-piperidyl)-5 beta-bisnorcholane-hydrochloride;
3 alpha-acetoxy-22-(N-morpholino)-5-beta-bisnorcholane;
3 alpha-acetoxy-22-(N-morpholino)-5 beta-bisnorcholane-hydrochloride;
22-(N-morpholino)-5 beta-bisnorcholane-3 alpha-ol;
22-(N-morpholino)-5 beta-bisnorcholane-3 alpha-ol-hydrochloride;
3 alpha-acetoxy-22-(N-pyrrolidino)-5-beta-bisnorcholane;
22-(N-pyrrolidino)-5-beta-bisnorcholane-3 alpha-ol;
22-(N-pyrrolidino)-5 beta-bisnorcholane-3 alpha-ol-hydrochloride;
3 alpha-acetoxy-22-(N-diethyl-amino)-5-beta-bisnorcholane;
22-(N-diethylamino)-5 beta-bisnorcholane-3 alpha-ol;
22-(N-diethylamino)-5 beta-bisnorcholane-3 alpha-ol-hydrochloride;
22 amino-5 beta-bisnorcholane-3 alpha-ol;
22 amino-5 beta bisnorcholane-3 alpha-ol-hydrochloride;
22-(N-piperidyl)-5 beta-bisnorcholane-3 beta-ol;
22-(phenylamino)-5 beta-bisnorcholane-3 alpha-ol;
22-(phenylamino)-5 beta-bisnorcholane-3 alpha-ol-hydrochloride;
22-amino-5 beta-bisnorcholane;
22-amino-5 beta-bisnorcholane-hydrochloride;
22-(N-piperidyl)-delta⁴-bisnorcholene-3-one;
22-(N-piperidyl)-delta⁴-bisnorcholene-3-one-hydrochloride;
22-(N-piperidino)-5 beta-bisnorcholane-3 alpha-ol-methiodide;
22-N-methylamino-5 beta-bisnorcholane-3 alpha-ol;
22-N-methylamino-5 beta-bisnorcholane-3 alpha-ol-hydrochloride;
22-(N-1,2,3,4-tetrahydroquinolino)-5 beta-bisnorcholane-3 alpha-ol;
22-(n-1,2,3,4-tetrahydroquinolino)-5 beta-bisnorcholane-3 alpha-ol-hydrochloride;
22-(N-1,2,3,4-tetrahydroisoquinolino)-5 beta-bisnorcholane-3 alpha-ol;
22-(N-1,2,3,4-tetrahydroisoquinolino)-5 beta-bisnorcholane-3 alpha-ol-hydrochloride;
22-(N-2-methylpiperidino)-5 beta-bisnorcholane-3 alpha-ol;
22-(N-2-methylpiperidino)-5 beta-bisnorcholane-3 alpha-ol-hydrochloride;
22-(N-3-methylpiperidino)-5 beta-bisnorcholane-3 alpha-ol;
22-(N-3-methylpiperidino)-5 beta-bisnorcholane-3 alpha-ol-hydrochloride;
22-(4-methylpiperidino)-5 beta-bisnorcholane-3 alpha-ol;
22-(N-4-methylpiperidino)-5 beta-bisnorcholane-3 alpha-ol-hydrochloride;
22-(N-2,6-dimethylpiperidino)-5 beta-bisnorcholane-3 alpha-ol;
22-(N-2,6-dimethylpiperidino)-5 beta-bisnorcholane-3 alpha-ol-hydrochloride;
22-(N-piperidyl)-5 beta-bisnorcholane-3 alpha-ol-3,4,5-trihydroxybenzoate;
22-(N-piperidyl)-5 beta-bisnorcholane-3 beta-ol-2,3,4-trihydroxybenzoate;
22-(N-piperidyl)-5 beta-bisnorcholane-3 alpha-ol-2,6-dihydroxybenzoate;
22-(N-piperidyl)-5 beta-bisnorcholane-3 alpha-ol-2-chlorobenzoate;
22-(N-piperidyl)-delta⁴-bisnorcholene-3,11 beta-diol;
22-(N-piperidyl)-delta⁴-bisnorcholene-11 beta-ol-3-one;
22-(N-piperidyl)-delta⁴-bisnorcholene-11 beta-ol-3-one-hydrochloride;
22-amino-bisnorcholane-3-one;
22-amino-bisnorcholane-3-one-hydrochloride;
22-N-imidazolyl-5 beta-bisnorcholane-3 alpha-ol;
22-N-imidazolyl-5 beta-bisnorcholane-3 alpha-ol-hydrochloride;
22-(N-isopropylamino)-5 beta-bisnorcholane-3 alpha-ol;
22-(N-isopropylamino)-5-beta-bisnorcholane-3 alpha-ol-hydrochloride;
22-(N-benzylamino)-5 beta-bisnorcholane-3 alpha-ol;
22-(N-benzylamino)-5 beta-bisnorcholane-3 alpha-ol-hydrochloride;

and an inert, pharmaceutically accceptable carrier combined with said active ingredient.

2. A compound as set forth in claim 1 and known as 22-(N-piperidyl)-5 beta-bisnorcholane-3 alpha-ol and its salts selected from the group consisting of hydrochloride, 2,6-dihydroxy-benzoate, methiodide, 3,4,5-trihydroxy-benzoate, 2,3,4-trihydroxy-benzoate, and 2-chlorobenzoate.

3. A compound as set forth in claim 1 and known as 22-(N-piperidyl)-5 beta-bisnorcholane-3-one and its hydrochloride.

4. A compound as set forth in claim 1 and known as 22-(N-morpholino)-5 beta-bisnorcholane-3-alpha-ol, and its hydrochloride.

5. A compound as set forth in claim 1 known as 22-amino-5 beta-bisnorcholane-3-alpha-ol, and its hydrochloride.

6. A compound as set forth in claim 1 known as 22-amino-5 beta-bisnorcholane, and its hydrochloride.

7. A compound as set forth in claim 1 known as 22-N-methylamino-5 beta-bisnorcholane-3-alpha-ol, and its hydrochloride.

8. A compound as set forth in claim 1 known as 22-(N-1,2,3,4-tetrahydroisoquinolino)-5 beta-bisnorcholane-3 alpha-ol, and its hydrochloride.

9. A compound as set forth in claim 1 known as 22-(N-2-methylpiperidino)-5 beta-bisnorcholane-3-alpha-ol, and its hydrochloride.

10. A compound as set forth in claim 1 known as 22-(N-3-methylpiperidino)-5 beta-bisnorcholane-3 alpha-ol, and its hydrochloride.

11. A compound as set forth in claim 1 known as 22-(N-4-methylpiperidino)-5 beta-bisnorcholane-3 alpha-ol, and its hydrochloride.

12. A compound as set forth in claim 1 known as 22-(N-2,6 - dimethylpiperidino)-5 beta-bisnorcholane-3 alpha-ol, and its hydrochloride.

13. A compound as set forth in claim 1 known as 22-(N-piperidyl)-delta$^4$-bisnorcholene - 3,11 - beta-ol-3-one, and its hydrochloride.

14. A compound as set forth in claim 1 known as 22-amino-bisnorcholane-3-one, and its hydrochloride.

15. A compound as set forth in claim 1 known as 22-(N-isopropylamino)-5 beta-bisnorcholane-3 alpha-ol, and its hydrochloride.

16. A compound as set forth in claim 1 known as 22-(N-diethylamino)-5 beta-bisnorcholane-3 alpha-ol, and its hydrochloride.

17. A compound as set forth in claim 1 known as 22-(N-pyrrolidino)-5 beta-bisnorcholane-3 alpha-ol, and its hydrochloride.

18. A compound as set forth in claim 1 and known as 22-(N-piperidyl)-5 beta-bisnorcholane, and its hydrochloride.

References Cited

UNITED STATES PATENTS

| | | | |
|---|---|---|---|
| 2,886,564 | 5/1959 | Holysz | 260—239.5 |
| 2,697,107 | 12/1954 | Ruschig et al. | 260—397.2 |
| 3,038,912 | 6/1962 | Nysted | 260—397.1 |
| 3,342,811 | 9/1967 | Sarel et al. | 260—239.5 |

ELBERT L. ROBERTS, Primary Examiner

U.S. Cl. X.R.

260—239.5, 239.55, 397, 397.3, 397.45, 397.47, 397.5